United States Patent
Nago (10) Patent No.: US 8,720,651 B2
(45) Date of Patent: May 13, 2014

(54) REVERSIBLE HYDRAULIC CALIPER BRAKE FOR A BICYCLE

(75) Inventor: Daisuke Nago, Sakai (JP)

(73) Assignee: Shimano, Inc., Sakai (JP)

( * ) Notice: Subject to any disclaimer, the term of this patent is extended or adjusted under 35 U.S.C. 154(b) by 177 days.

(21) Appl. No.: 12/789,438

(22) Filed: May 27, 2010

(65) Prior Publication Data

US 2011/0290595 A1 Dec. 1, 2011

(51) Int. Cl.
*B62L 3/00* (2006.01)
(52) U.S. Cl.
USPC ............. 188/24.22; 188/24.19; 188/24.12
(58) Field of Classification Search
USPC ........... 188/24.11, 24.12, 24.19, 24.22, 72.4, 188/344
See application file for complete search history.

(56) References Cited

U.S. PATENT DOCUMENTS

| | | | |
|---|---|---|---|
| 3,338,337 A | | 8/1967 | Freeland et al. |
| 3,899,057 A | | 8/1975 | Carre |
| 6,308,806 B1 | * | 10/2001 | Nielsen ................... 188/24.11 |
| 2011/0011683 A1 | * | 1/2011 | Tetsuka et al. ........... 188/24.19 |

FOREIGN PATENT DOCUMENTS

| | | |
|---|---|---|
| DE | 3303586 A1 | 8/1984 |
| DE | 3325970 A1 | 1/1985 |
| EP | 0166905 A1 * | 1/1986 |
| EP | 0575720 A1 | 4/1993 |
| WO | 98-58836 A1 | 12/1998 |

OTHER PUBLICATIONS

U.S. Appl. No. 12/504,964, filed Jul. 17, 2009; "Hydraulic Caliper Brake for a Bicycle"; Tetsuka et al.; unpublished as of May 27, 2010.
U.S. Appl. No. 12/504,993, filed Jul. 17, 2009; "Quick Release Apparatus for a Bicycle Hydraulic Caliper Brake"; Tetsuka et al.; unpublished as of May 27, 2010.

* cited by examiner

*Primary Examiner* — Bradley King
*Assistant Examiner* — Vu Q Nguyen
(74) *Attorney, Agent, or Firm* — James A. Deland (57) ABSTRACT

A bicycle hydraulic caliper brake apparatus includes a first brake arm with a first bearing surface, a second brake arm with a second bearing surface, and a hydraulic control device that includes a housing and a piston unit. The first bearing surface non-lockingly engages the piston unit, and the second bearing surface non-lockingly engages the housing. At least one of the piston unit or the housing engages a corresponding first or second bearing surface so that the piston unit or the housing rotates at least in part around an axis that is substantially parallel to at least one of the rotational axes of the brake arms. The housing is carried by the first brake arm and the second brake arm so that the housing moves together with the first brake arm and the second brake arm relative to a bicycle frame member.

19 Claims, 5 Drawing Sheets

REVERSIBLE HYDRAULIC CALIPER BRAKE FOR A BICYCLE

BACKGROUND OF THE INVENTION

The present invention is directed to bicycle brake devices and, more particularly, to a hydraulic caliper brake for a bicycle.

A typical bicycle caliper brake comprises first and second brake arms, wherein each brake arm includes a brake arm mounting portion, a brake pad mounting portion and a control interface portion. The brake arm mounting portion is structured to pivotably mount the brake arm to the bicycle frame or fork, the brake pad mounting portion is structured to mount a brake pad to the brake arm, and the control interface portion is structured to mount a control element such as a control cable to the brake arm. The first and second brake arms pivot relative to the bicycle frame or fork to move their respective brake pads toward and away from each other in response to the operation of the control element.

Hydraulic caliper brakes typically use a hydraulic piston assembly coupled between the control interface portions of the first and second brake arms in order to pivot the first and second brake arms relative to the bicycle frame or fork. Typically, the hydraulic piston assembly comprises a cylindrical housing that defines a hydraulic chamber. A piston is disposed in the hydraulic chamber for movement along a piston axis in response to hydraulic fluid that is selectively introduced into and withdrawn from the hydraulic chamber through a conduit that is coupled to the housing. The housing is coupled to one of the brake arms, and the piston is coupled to the other brake arm. Thus, hydraulic caliper brakes tend to be asymmetrical. As a result, the conduit that supplies the hydraulic fluid to the hydraulic chamber usually is located closer to one of the brake arms. Because of such positioning, the conduit may not be located in the optimum position to travel effectively from the housing to the handlebar-mounted control device that supplies the hydraulic fluid. The problem is made worse by the fact that conventional conduits typically lack flexibility.

SUMMARY OF THE INVENTION

The present invention is directed to various features of a bicycle caliper brake apparatus. In one embodiment, a bicycle hydraulic caliper brake apparatus comprises a first brake arm, a second brake arm, and a hydraulic control device. The first brake arm includes a first brake arm mounting portion for mounting to a bicycle frame member for pivoting around a first axis, a first brake pad mounting portion, and a first control interface portion that has a first bearing surface. Similarly, the second brake arm has a second brake arm mounting portion for mounting to the bicycle frame member for pivoting around a second axis, a second brake pad mounting portion, and a second control interface portion that has a second bearing surface. The hydraulic control device includes a housing defining a hydraulic chamber, a piston unit including a piston disposed in the hydraulic chamber for movement along a piston axis in response to hydraulic pressure, and a hydraulic fluid supply opening in fluid communication with the hydraulic chamber for communicating hydraulic fluid from an external hydraulic fluid source into the hydraulic chamber. The first bearing surface of the first brake arm non-lockingly engages the piston unit, and the second bearing surface of the second brake arm non-lockingly engages the housing. At least one of the piston unit or the housing engages the corresponding first or second bearing surface so that the piston unit or the housing rotates at least in part around an axis that is substantially parallel to the corresponding first or second axis. The housing is carried by the first brake arm and the second brake arm so that the housing moves together with the first brake arm and the second brake arm relative to the bicycle frame member.

In another embodiment, a bicycle hydraulic caliper brake apparatus again comprises a first brake arm, a second brake arm, and a hydraulic control device. The first brake arm includes a first brake arm mounting portion for mounting to a bicycle frame member for pivoting around a first axis, a first brake pad mounting portion, and a first control interface portion. Similarly, the second brake arm has a second brake arm mounting portion for mounting to the bicycle frame member for pivoting around a second axis, a second brake pad mounting portion, and a second control interface portion. The hydraulic control device includes a housing defining a hydraulic chamber, a piston disposed in the hydraulic chamber for movement along a piston axis in response to hydraulic pressure, and a hydraulic fluid supply opening in fluid communication with the hydraulic chamber for communicating hydraulic fluid from an external hydraulic fluid source into the hydraulic chamber. The piston is coupled to the first control interface portion of the first brake arm, and the housing is coupled to the second control interface portion of the second brake arm. An adjustment mechanism is provided for adjusting a length between the piston and the first control interface portion of the first brake arm.

Additional inventive features will become apparent from the description below, and such features alone or in combination with the above features and their equivalents may form the basis of further inventions as recited in the claims.

DETAILED DESCRIPTION OF THE EMBODIMENTS

Figure 1:
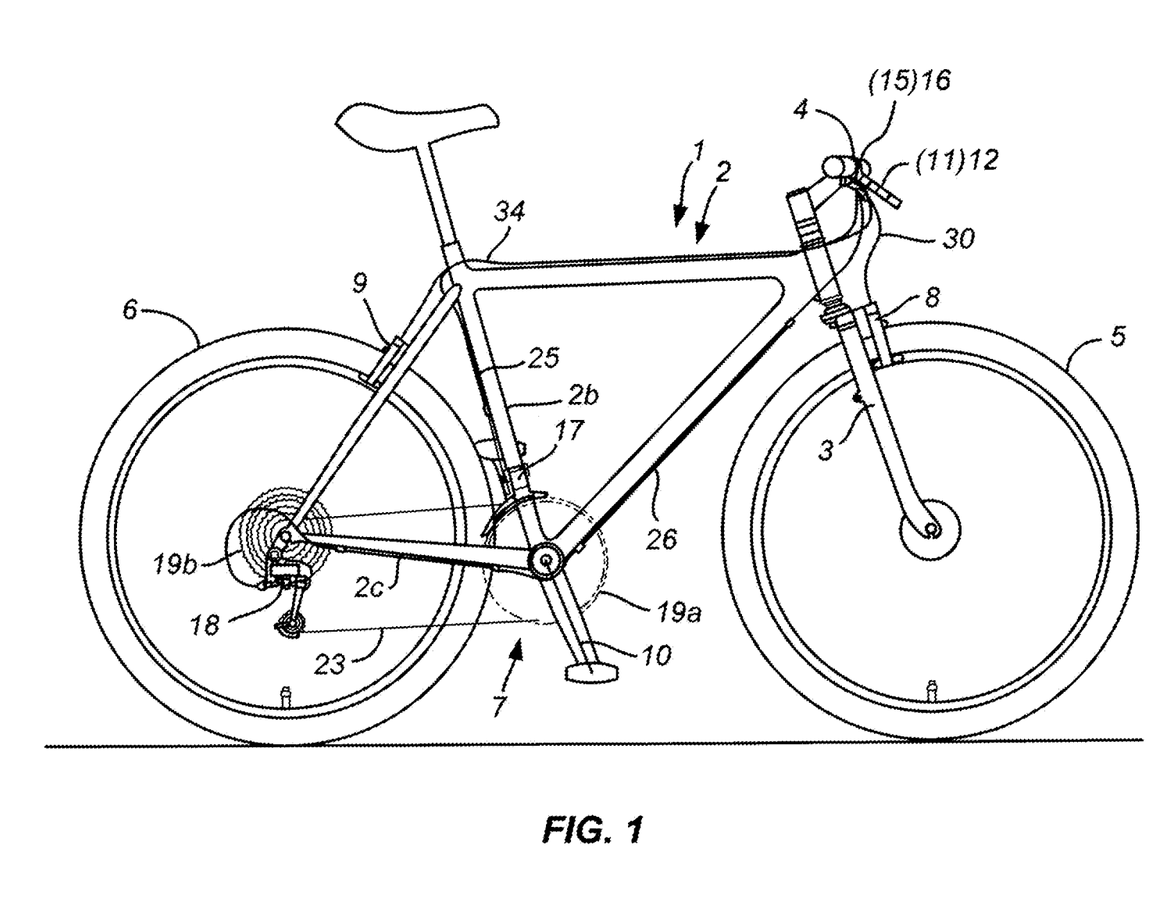
FIG. 1 is a side view of a bicycle that employs an embodiment of a caliper brake.

FIG. 1 is a side view of a particular embodiment of a bicycle 1. In this embodiment, bicycle 1 is a mountain bicycle comprising a diamond-shaped frame 2, a front fork 3 (an example of a bicycle frame member) rotatably mounted to frame 2, a handlebar assembly 4 mounted to the upper part of fork 3, a front wheel 5 rotatably attached to the lower part of fork 3, a rear wheel 6 rotatably attached to the rear of frame 2, and a drive unit 7. A hydraulically-operated front wheel caliper brake assembly 8 is provided for braking front wheel 5, and a hydraulically-operated rear wheel caliper brake assembly 9 is provided for braking rear wheel 6.

Drive unit 7 comprises a chain 23, a front sprocket assembly 19a coaxially mounted with a pedal crank unit 10 having pedals, a front derailleur 17 attached to a seat tube 2b of frame 2, a rear sprocket assembly 19b coaxially mounted with rear wheel 6, and a rear derailleur 18 mounted to the rear end of a chain stay 2c of frame 2. Front derailleur 17 and rear derailleur 18 are connected to respective front and rear shift control devices 15 and 16 through front and rear shift cables 25 and 26. Front and rear shift control devices 15 and 16 are mounted to the inside of and are in proximity to hydraulic brake lever assemblies 11 and 12 mounted on handlebar 4.

Hydraulic brake lever assemblies 11 and 12 have a symmetrical construction. Each brake lever assembly 11 and 12 may comprise a conventional hydraulic master cylinder piston assembly, wherein the master cylinder for lever assembly 11 is hydraulically coupled to front wheel caliper brake assembly 8 through a conduit 30, and the master cylinder for lever assembly 12 is hydraulically coupled to rear wheel caliper brake assembly 9 through a hydraulic conduit 34. Brake lever assemblies 11 and 12 do not form a part of the present invention and will not be described further. Front and rear wheel caliper brake assemblies 8 and 9 have the same construction, so only front wheel caliper brake assembly 8 will be described in detail.

Figure 2:
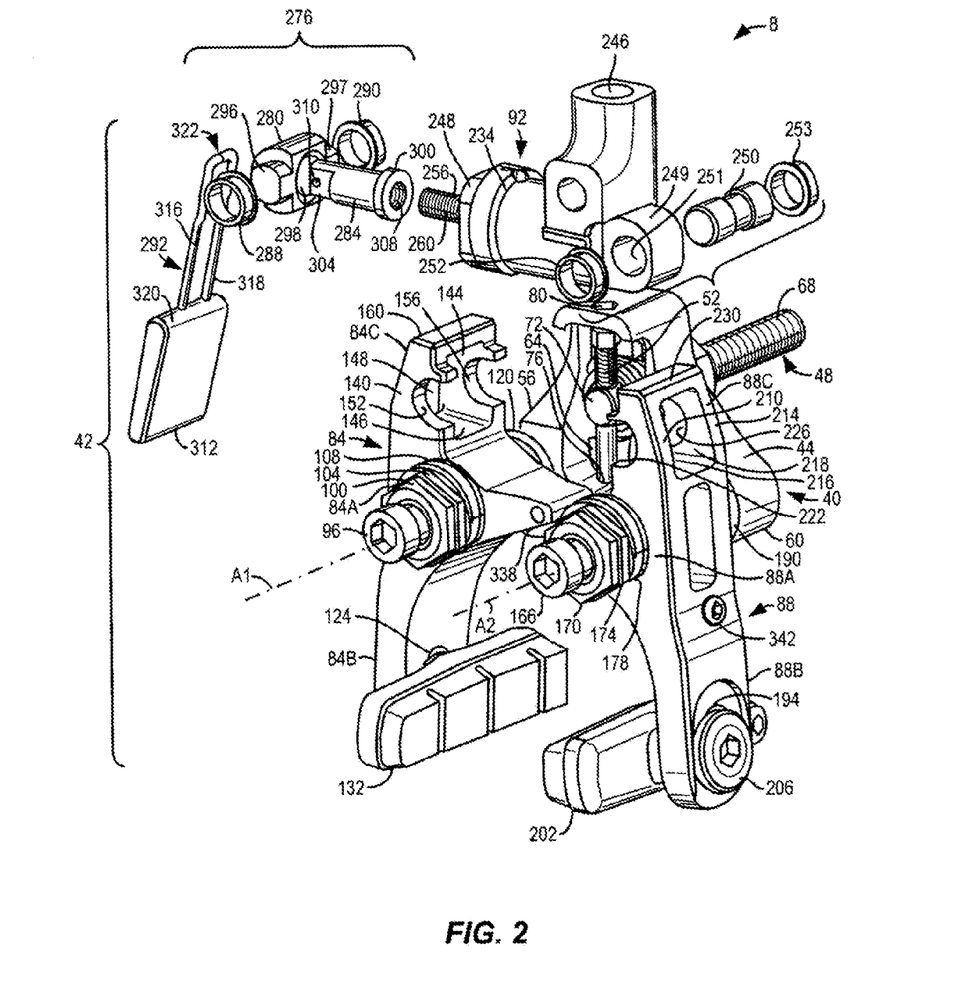
FIG. 2 is a partially exploded perspective view of an embodiment of a front caliper brake assembly.

As shown in FIG. 2, front wheel caliper brake assembly 8 comprises a mounting arch apparatus 40 and a hydraulic caliper brake apparatus 42. Mounting arch apparatus 40 comprises a mounting arch 44, a mounting bolt 48, and an adjustment bolt 52. Mounting arch 44 has a generally triangular shape and includes a first brake arm mounting portion 56, a second brake arm mounting portion 60, and an adjustment slot 64. Mounting bolt 48 comprises a threaded shaft portion 68 and an adjustment nut portion 72, wherein threaded shaft portion 68 is inserted into fork 3 to attach mounting arch apparatus 40 to fork 3. Adjustment nut portion 72 is disposed within adjustment slot 64 of mounting arch 44, and adjustment bolt 52 screws into adjustment nut portion 72. Adjustment bolt 52 is rotatably fitted within a blind bore 76 disposed at a lower surface of mounting arch 44, and adjustment bolt 52 also is rotatably fitted within another bore 80 disposed at an upper surface of mounting arch 44. Thus, the vertical position of mounting arch 44 relative to fork 3, and thereby brake assembly 8, may be adjusted by rotating adjustment bolt 52.

Hydraulic caliper brake apparatus 42 comprises a first brake arm 84, a second brake arm 88, and a hydraulic control device 92. First brake arm 84 has a first brake arm mounting portion 84a, a first brake pad mounting portion 84b, and a first control interface portion 84c, wherein first brake arm mounting portion 84a is disposed between first brake pad mounting portion 84b and first control interface portion 84c. A first pivot shaft bolt 96 extends through first and second spacer nuts 100, 104, through a first spacer washer 108, through a first bushing 112 (FIG. 3) disposed in an opening 116 in first brake arm mounting portion 84a, through a second spacer washer 120, and into a threaded opening (not shown) in first brake arm mounting portion 56 of mounting arch 44. As a result, first pivot shaft bolt 96 supports first brake arm 84 on mounting arch 44 for rotation around a first pivot axis A1.

First brake pad mounting portion 84b includes a vertically-oriented first brake pad mounting slot 124 for receiving a first brake pad mounting bolt 128 (FIG. 3) therein. First brake pad mounting bolt 128 is mounted to a first brake pad 132, and a first nut 136 screws onto a threaded portion of first brake pad mounting bolt 128. As a result of this structure, first brake pad 132 is adjustably fastened to first brake pad mounting portion 84b.

First control interface portion 84c includes first and second interface posts 140 and 144 that extend upwardly from an upper surface 146 of first brake arm mounting portion 84a. First and second interface posts 140 and 144 are spaced apart from each other to form a first space 148. First interface post 140 includes a C-shaped concave first interface recess bearing surface 152, and second interface post 144 includes a C-shaped concave second interface recess bearing surface 156. In this embodiment, first interface recess bearing surface 152 and second interface recess bearing surface 156 align with each other when viewed from the front of first brake arm 84. The tops of first and second interface posts 140 and 144 are connected together by a first top brace 160.

Second brake arm 88 has a second brake arm mounting portion 88a, a second brake pad mounting portion 88b, and a second control interface portion 88c, wherein second brake arm mounting portion 88a is disposed between second brake pad mounting portion 88b and second control interface portion 88c. A second pivot shaft bolt 166 extends through first and second spacer nuts 170, 174, through a first spacer washer 178, through a second bushing 182 (FIG. 3) disposed in an opening 186 in second brake arm mounting portion 88a, through a second spacer washer 190, and into a threaded opening (not shown) in second brake arm mounting portion 60 of mounting arch 44. As a result, second pivot shaft bolt 166 supports second brake arm 88 on mounting arch 44 for rotation around a second pivot axis A2.

Second brake pad mounting portion 88b includes a vertically-oriented second brake pad mounting slot 194 for receiving a second brake pad mounting bolt 198 (FIG. 3) therein. Second brake pad mounting bolt 198 is mounted to a second brake pad 202, and a second nut 206 screws onto a threaded portion of second brake pad mounting bolt 198. As a result of this structure, second brake pad 202 is adjustably fastened to second brake pad mounting portion 88b.

Second control interface portion 88c includes first and second interface posts 210 and 214 that extend upwardly from an upper surface 216 of first brake arm mounting portion 88a. First and second interface posts 210 and 214 are spaced apart from each other to form a second space 218. First interface post 210 includes a C-shaped concave first interface recess bearing surface 222, and second interface post 214 includes a C-shaped concave second interface recess bearing surface 226. In this embodiment, first interface recess bearing surface 222 and second interface recess bearing surface 226 align with each other when viewed from the front of second brake arm 88. The tops of first and second interface posts 210 and 214 are connected together by a top brace 230.

Figure 3:
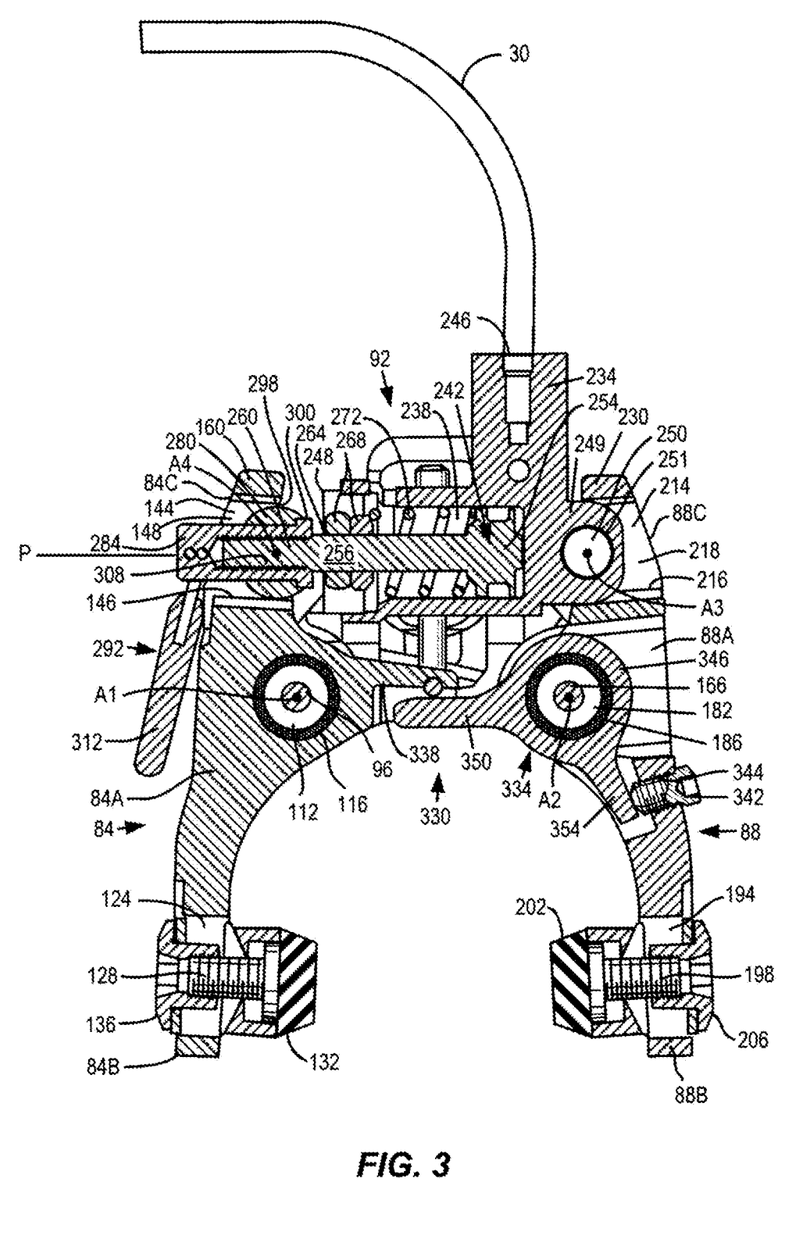
FIG. 3 is a front cross-sectional view of the caliper brake assembly shown in FIG. 2 showing the hydraulic control device in a first position.

As shown more clearly in FIG. 3, hydraulic control device 92 includes a housing 234 defining a hydraulic chamber 238, a piston unit 242 disposed in hydraulic chamber 238 for movement along a piston axis P in response to hydraulic pressure, and a hydraulic fluid supply opening 246 in fluid communication with hydraulic chamber 238 for communicating hydraulic fluid from an external hydraulic fluid source (such as the master cylinder in hydraulic brake lever assembly 11) into hydraulic chamber 238. A sealing cap 248 screws into the open end of housing 234. In this embodiment, housing 234 includes a C-shaped convex housing projection 249 that is dimensioned to fit within second space 218 in second brake arm 88. As shown more clearly in FIG. 2, a cylindrical pivot shaft 250 extends through an opening 251 in housing projection 249, and a pair of circular bearings 252 and 253 are fitted around the opposite ends of pivot shaft 250 for contacting and nesting within first and second interface recess bearing surfaces 222 and 226, respectively, in a non-locking manner. As a result, housing 234 may rotate around a third pivot axis A3 (FIG. 3) that is coaxial with pivot shaft 250 and parallel to first pivot axis A1 and second pivot axis A2.

Piston unit 242 includes a piston 254 and a piston rod 256. In this embodiment, piston rod 256 is formed as one piece with piston 254, extends from piston 254 along piston axis P, and includes a threaded end portion 260. Piston rod 256 extends through an opening 264 in sealing cap 248, and a pair of O-ring seals 268 are disposed within opening 264 of sealing cap 248 to sealingly engage piston rod 256. A spring 272 is disposed around piston rod 256 between piston 254 and sealing cap 248 for biasing piston 254 away from sealing cap 248.

An adjustment mechanism 276 is provided for adjusting a length between piston 254 and first control interface portion 84c of first brake arm 84. Adjustment mechanism 276 includes a first adjustment member 280, a second adjustment member 284, annular bearings 288 and 290, and a handle 292. In this embodiment, first adjustment member 280 comprises a C-shaped convex member having the general shape of a circumferentially truncated cylinder with reduced-diameter bearing supports 296 and 297 on opposite ends around which respective bearings 288 and 290 are fitted. An opening 298 extends diametrically through the middle of first adjustment member 280. Bearings 288 and 290 contact and nest within first and second interface recess bearing surfaces 152 and 156, respectively, in a non-locking manner. As a result, housing 234 and piston unit 242 may rotate around a fourth pivot axis A4 (FIG. 3) that is parallel to first pivot axis A1, second pivot axis A2, and third pivot axis A3. In this embodiment, the surfaces of bearings 288 and 290 and first and second interface recess bearing surfaces 152 and 156 of first control portion 84c of first brake arm 84 have the same dimensions as the surfaces of bearings 252 and 253 and first and second interface recesses 222 and 226 of second control portion 88c of second brake arm 84 so that the mounting position of hydraulic control device 92 relative to first and second brake arms 84 and 88 may be reversed. Of course, the dimensions need not be identical as long as they allow the mounting position of hydraulic control device 92 relative to first and second brake arms 84 and 88 to be reversed. In either case, housing 234 is carried by first brake arm 84 and second brake arm 88 so that housing 234 is movable together with first brake arm 84 and second brake arm 88 relative to fork 3 and mounting arch 44.

In this embodiment, second adjustment member 284 comprises a generally tubular member or sleeve having a flange 300 on one end, a pair of flats 304 on the other end (only one such flat is shown in FIG. 2), and a threaded inner peripheral surface 308. An opening 310 extends diametrically through second adjustment member 284 at flats 304. Threaded inner peripheral surface 308 screws onto threaded end portion 260 of piston rod 256. In the assembled state, second adjustment member 284 extends through opening 298 in first adjustment member 280 and extends through first space 148 of first control interface portion 84c of first brake arm 84.

Handle 292 includes a generally rectangular operating paddle 312 and first and second struts 316 and 318 that extend parallel from an upper edge 320 of operating paddle 312. The ends of first and second struts 316 and 318 bend towards each other and removably contact each other to form a connecting strut 322. Connecting strut 322 is dimensioned to extend into opening 310 in second adjustment member 284 to connect handle 292 to second adjustment member 284. As shown in FIG. 3, first control interface portion 84c of first brake arm 84 is disposed between first adjustment member 280 and handle 292 when adjustment mechanism 276 is assembled to piston rod 256 and first brake arm 84. Furthermore, flange 300 of second adjustment member 284 abuts against first adjustment member 280. As a result of this structure, handle 292 may be used to turn second adjustment member 284 relative to piston rod 256 to vary the combined length of piston rod 256 and second adjustment member 284 along piston axis P, thereby adjusting a length between piston 254 and first control interface portion 84c of first brake arm 84. In this embodiment, the horizontal width of operating paddle 312 is greater than the horizontal, vertical and diagonal widths of first space 148 of first control interface portion 84c. Thus, operating paddle 312 cannot extend through first space 148. However, the ends of first and second struts 316 and 318 may be pulled apart sufficiently so that handle 292 may be removed from second adjustment member 284. As a result of this structure, the left end of hydraulic control device 92 may be releasably and loosely retained to first brake arm 84 without adjustment mechanism 276 interfering with the pivoting of housing 234 and piston unit 242 relative to first brake arm 84 or second brake arm 88.

Finally, as shown in FIG. 3, hydraulic caliper brake apparatus 42 includes a width adjustment device 330. Width adjustment device 330 may be used to set the spacing between first brake pad 132 and second brake pad 202 when hydraulic caliper brake apparatus 42 is in a rest state. Width adjustment device 330 comprises a stopper member 334, a leg extension member 338 that extends generally horizontally from first brake arm mounting portion 84a of first brake arm 84, and an adjustment screw 342 that is screwed into a threaded opening 344 in second brake arm 88. Stopper member 334 has an annular mounting portion 346, a first leg 350 and a second leg 354. Annular mounting portion 346 is rotatably mounted around second bushing 182, and first and second legs 350 and 354 extend radially outwardly from annular mounting portion to form an obtuse angle. First leg 350 engages leg extension member 338, and second leg 354 engages adjustment screw 342. As a result, the overall spacing between first brake pad 132 and second brake pad 202 may be adjusted by turning adjustment screw 342.

To assemble hydraulic control device 92 in the position shown in FIG. 3, second adjustment member 284 is screwed onto threaded end portion 260 of piston rod 256 and inserted through opening 298 in first adjustment member 280. Bearings 288 and 290 are fitted around respective bearing supports 296 and 297 on first adjustment member 280, pivot shaft 250 is inserted through opening 251 in housing projection 249, and bearings 252 and 253 are fitted around the respective ends of pivot shaft 250. Thereafter, bearings 288 and 290 are fitted within first and second interface recess bearing surfaces 152 and 156 in first control interface portion 84c of first brake arm 84 so that second adjustment member 284 extends through first space 148 in first control interface portion 84c of first brake arm 84. Bearings 252 and 253 then are fitted within respective first and second interface recess bearing surfaces 222 and 226 in second control interface portion 88c of second brake arm 88. Finally, first and second struts 316 and 318 of handle 292 are spread apart to enable the bent ends of first and second struts 316 and 318 to be inserted into opening 310 in second adjustment member 284.

Figure 4:
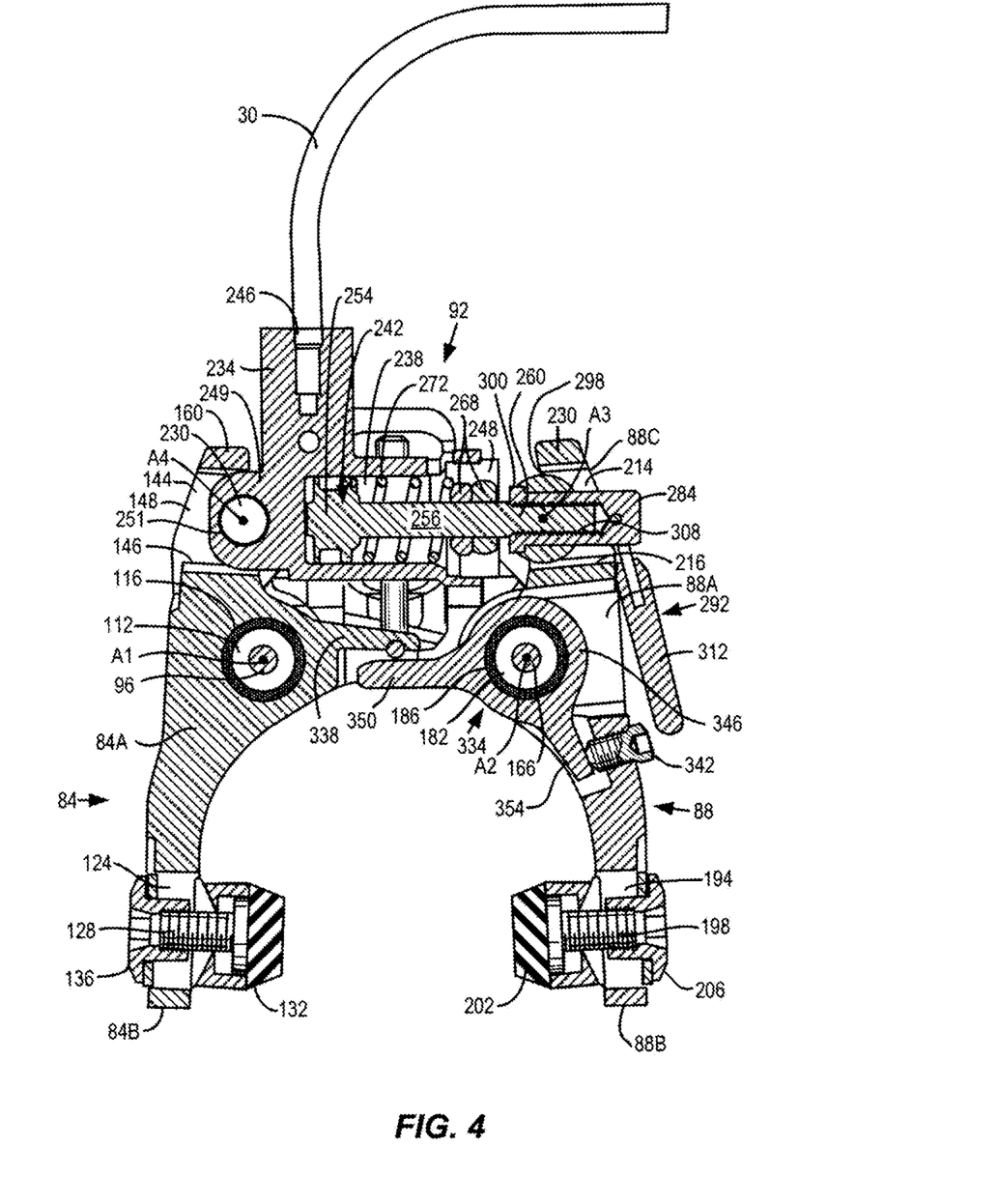
FIG. 4 is a front cross-sectional view of the caliper brake assembly shown in FIG. 2 showing the hydraulic control device in a reversed position.

If it is desired to assemble hydraulic control device in the position shown in FIG. 4, the process is basically repeated except that bearings 288 and 290 are fitted within first and second interface recess bearing surfaces 222 and 226 in second control interface portion 88c of second brake arm 88 so that second adjustment member 284 extends through second space 218 in second control interface portion 88c of second brake arm 88. Then, bearings 252 and 253 are fitted within first and second interface recess bearing surfaces 152 and 156 in first control interface portion 84c of first brake arm 84.

Because hydraulic control device 92 may be assembled between first and second brake arms 84 and 88 either in the position shown in FIG. 3 or in the position shown in FIG. 4, a single hydraulic caliper brake apparatus may be used on fork 3 while allowing conduit 30 to be located on whatever side of front wheel caliper brake assembly 8 is more efficient. For example, if it is desired to operate front wheel caliper brake assembly 8 with the brake lever assembly mounted on the right side of handlebar assembly 4, then hydraulic control device 92 may be assembled in the position shown in FIG. 3 to allow more room to bend conduit 30 towards the brake lever assembly (to the left in FIG. 3). Similarly, if it is desired to operate front wheel caliper brake assembly 8 with the brake lever assembly mounted on the left side of handlebar assembly 4, then hydraulic control device 92 may be assembled in the position shown in FIG. 4 to allow more room to bend conduit 30 towards that brake lever assembly (to the right in FIG. 4).

There are further, unexpected benefits of using the reversible hydraulic control device 92 disclosed herein. For example, when hydraulic conduits of conventional caliper brake assemblies are forced to bend unnaturally, then the conduit resists such bending and causes the caliper brake assembly to rotate relative to the brake mount, especially when the piston assembly is carried by the brake arms and is not fixedly attached to the bicycle frame. Such rotation of the caliper brake assembly causes the respective spaces between the brake pads and the rim to be uneven. As a result, the brake pads contact the rim at different times when the brake is operated, thereby resulting in inefficient braking and uneven brake pad wear. The reversible hydraulic control device 92 disclosed herein minimizes or eliminates such problems because hydraulic control device 92 may be assembled to brake arms 84 and 88 in whatever orientation maximizes the distance available to allow conduit 30 to bend naturally, thereby minimizing or eliminating undesirable rotation of the caliper brake assembly. Adjustment mechanism 276 may be used to compensate for any remaining uneven spacing between first brake pad 132 and second brake pad 202 relative to the rim of front wheel 5. Finally, handle 292 of adjustment mechanism 276 allows hydraulic control device 92 to be releasably and loosely retained to first brake arm 84 without adjustment mechanism 276 interfering with the pivoting of first brake arm 84 or second brake arm 88 during operation.

Figure 5:
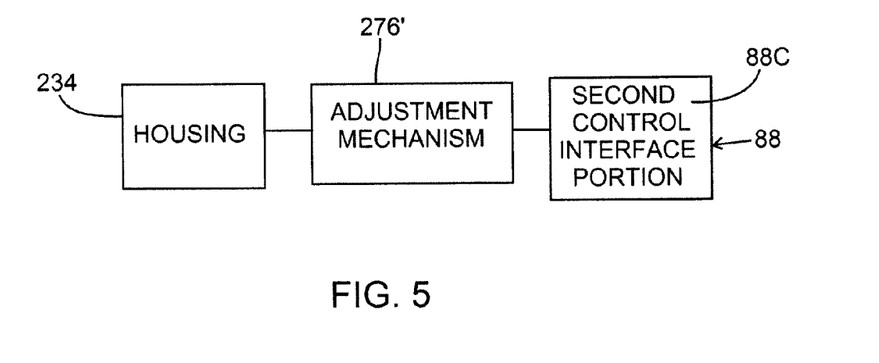
FIG. 5 is a schematic block diagram of an alternative embodiment of a caliper brake assembly.

While the above is a description of various embodiments of inventive features, further modifications may be employed without departing from the spirit and scope of the present invention. For example, the size, shape, location or orientation of the various components may be changed as desired. While bearing surfaces 152, 156, 222 and 226 were concave in the disclosed embodiment, bearing surfaces 152, 156, 222 and 226 could be formed convex and to engage concave bearing surfaces associated with adjustment mechanism 276 or housing 324. While adjustment mechanism 276 adjusted a length between piston 254 and first control interface portion 84c of first brake arm 84c, FIG. 5 schematically illustrates how an adjustment mechanism 276' could be provided to adjust a length between housing 234 and second control interface portion 88c of second brake arm 88. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Terms of degree such as "substantially," "about" and "approximately" as used herein include a reasonable amount of deviation of the modified term such that the end result is not significantly changed. Thus, the scope of the invention should not be limited by the specific structures disclosed or the apparent initial focus or emphasis on a particular structure or feature.

What is claimed is:

1. A bicycle hydraulic caliper brake apparatus comprising:
a first brake arm having a first brake arm mounting portion for mounting to a bicycle frame member for pivoting around a first axis, a first brake pad mounting portion, and a first control interface portion that has a first bearing surface;
a second brake arm having a second brake arm mounting portion for mounting to the bicycle frame member for pivoting around a second axis, a second brake pad mounting portion, and a second control interface portion that has a second bearing surface;
a hydraulic control device including:
a housing defining a hydraulic chamber;
a piston unit including a piston disposed in the hydraulic chamber for movement along a piston axis in response to hydraulic pressure; and
a hydraulic fluid supply opening in fluid communication with the hydraulic chamber for communicating hydraulic fluid from an external hydraulic fluid source into the hydraulic chamber;
wherein the first bearing surface of the first brake arm removably engages the piston unit so that the piston unit can be disengaged from the first bearing surface of the first brake arm solely by pulling the brake arm away from the piston unit without disassembling the piston unit;
wherein the second bearing surface of the second brake arm removably engages the housing;
wherein at least one of the piston unit or the housing engages the corresponding first or second bearing surface so that the piston unit or the housing rotates at least in part around an axis that is substantially parallel to the corresponding first or second axis; and
wherein the housing is carried by the first brake arm and the second brake arm so that the housing moves together with the first brake arm and the second brake arm relative to the bicycle frame member.

2. The apparatus according to claim 1 further comprising one of a concave surface or a convex surface coupled to the piston unit, wherein the one of the concave surface or the convex surface non-lockingly contacts the first bearing surface.

3. The apparatus according to claim 2 wherein the first bearing surface has a complementary convex or concave surface that contacts the one of the concave surface or convex surface coupled to the piston unit.

4. The apparatus according to claim 1 further comprising one of a concave surface or a convex surface coupled to the housing, wherein the one of the concave surface or the convex surface non-lockingly contacts the second bearing surface.

5. The apparatus according to claim 4 wherein the second bearing surface has a complementary convex or concave surface that contacts the one of the concave surface or convex surface coupled to the housing.

6. The apparatus according to claim 5 wherein the surface coupled to the housing is convex, and wherein the second bearing surface is concave.

7. The apparatus according to claim 6 further comprising a convex surface coupled to the piston unit, wherein the first bearing surface has a complementary concave shape, and wherein the convex surface coupled to the piston unit non-lockingly contacts the first bearing surface.

8. The apparatus according to claim 1 further comprising an adjustment mechanism for adjusting either a length between the piston unit and the first control interface portion of the first brake arm or a length between the housing and the second control interface portion of the second brake arm.

9. The apparatus according to claim 8 wherein the adjustment mechanism extends into an opening in the corresponding first control interface portion or second control interface portion.

10. The apparatus according to claim 8 wherein the adjustment mechanism threadingly engages the corresponding piston unit or housing.

11. The apparatus according to claim 8 wherein the adjustment mechanism includes one of a rod or a sleeve that engages another one of a rod or a sleeve coupled to the corresponding piston or housing.

12. The apparatus according to claim 11 wherein the sleeve threadingly engages the rod.

13. The apparatus according to claim 8 wherein the adjustment mechanism includes a first adjustment member that non-lockingly contacts the first bearing surface or the second bearing surface on the corresponding first control interface portion or second control interface portion.

14. A bicycle hydraulic caliper brake apparatus comprising:
  a first brake arm having a first brake arm mounting portion for mounting to a bicycle frame member for pivoting around a first axis, a first brake pad mounting portion, and a first control interface portion that has a first bearing surface;
  a second brake arm having a second brake arm mounting portion for mounting to the bicycle frame member for pivoting around a second axis, a second brake pad mounting portion, and a second control interface portion that has a second bearing surface;
  a hydraulic control device including:
    a housing defining a hydraulic chamber;
    a piston unit including a piston disposed in the hydraulic chamber for movement along a piston axis in response to hydraulic pressure; and
    a hydraulic fluid supply opening in fluid communication with the hydraulic chamber for communicating hydraulic fluid from an external hydraulic fluid source into the hydraulic chamber;
  wherein the first bearing surface of the first brake arm removably engages the piston unit so that the piston unit can be removed from the first brake arm by manipulating the piston unit relative to the first brake arm;
  wherein the second bearing surface of the second brake arm removably engages the housing;
  wherein at least one of the piston unit or the housing engages the corresponding first or second bearing surface so that the piston unit or the housing rotates at least in part around an axis that is substantially parallel to the corresponding first or second axis;
  wherein the housing is carried by the first brake arm and the second brake arm so that the housing moves together with the first brake arm and the second brake arm relative to the bicycle frame member; and
  an adjustment mechanism for adjusting either a length between the piston unit and the first control interface portion of the first brake arm or a length between the housing and the second control interface portion of the second brake arm;
  wherein the adjustment mechanism includes a first adjustment member that non-lockingly contacts the first bearing surface or the second bearing surface on the corresponding first control interface portion or second control interface portion; and
  wherein the adjustment mechanism includes a second adjustment member that extends into an opening in the corresponding first control interface portion or second control interface portion.

15. A bicycle hydraulic caliper brake apparatus comprising:
  a first brake arm having a first brake arm mounting portion for mounting to a bicycle frame member for pivoting around a first axis, a first brake pad mounting portion, and a first control interface portion that has a first bearing surface;
  a second brake arm having a second brake arm mounting portion for mounting to the bicycle frame member for pivoting around a second axis, a second brake pad mounting portion, and a second control interface portion that has a second bearing surface;
  a hydraulic control device including:
    a housing defining a hydraulic chamber;
    a piston unit including a piston disposed in the hydraulic chamber for movement along a piston axis in response to hydraulic pressure; and
    a hydraulic fluid supply opening in fluid communication with the hydraulic chamber for communicating hydraulic fluid from an external hydraulic fluid source into the hydraulic chamber;
  wherein the first bearing surface of the first brake arm removably engages the piston unit so that the piston unit can be removed from the first brake arm by manipulating the piston unit relative to the first brake arm;
  wherein the second bearing surface of the second brake arm removably engages the housing;
  wherein at least one of the piston unit or the housing engages the corresponding first or second bearing surface so that the piston unit or the housing rotates at least in part around an axis that is substantially parallel to the corresponding first or second axis;
  wherein the housing is carried by the first brake arm and the second brake arm so that the housing moves together with the first brake arm and the second brake arm relative to the bicycle frame member; and
  an adjustment mechanism for adjusting either a length between the piston unit and the first control interface portion of the first brake arm or a length between the housing and the second control interface portion of the second brake arm;
  wherein the adjustment mechanism includes a first adjustment member that non-lockingly contacts the first bearing surface or the second bearing surface on the corresponding first control interface portion or second control interface portion; and
  wherein the adjustment mechanism includes a second adjustment member that engages the piston unit.

16. The apparatus according to claim 15 wherein the second adjustment member extends through an opening in the first adjustment member.

17. The apparatus according to claim 16 wherein the second adjustment member includes one of a rod or a sleeve that engages another one of a rod or a sleeve coupled to the piston.

18. The apparatus according to claim 17 wherein the second adjustment member threadingly engages the rod or the sleeve coupled to the piston.

19. The apparatus according to claim 18 further comprising a handle for turning the sleeve relative to the rod, wherein the first control interface portion is disposed between the handle and the first adjustment member.

* * * * *